United States Patent [19]
Akutsu

[11] Patent Number: 5,197,312
[45] Date of Patent: Mar. 30, 1993

[54] CABLE CONNECTOR FOR STEERING LOCK DEVICE

[75] Inventor: Shoji Akutsu, Kanagawa, Japan

[73] Assignee: Alpha Corporation, Kawagawa, Japan

[21] Appl. No.: 780,515

[22] Filed: Oct. 22, 1991

[30] Foreign Application Priority Data

Feb. 28, 1991 [JP] Japan ................. 3-23896[U]

[51] Int. Cl.⁵ .................................. E05B 65/12
[52] U.S. Cl. ............................. 70/247; 70/252
[58] Field of Search ............... 70/237, 245, 247, 248, 70/252; 74/878, 483 PB, 483 R

[56] References Cited

U.S. PATENT DOCUMENTS

| | | | |
|---|---|---|---|
| 4,724,722 | 2/1988 | Beauch et al. | 70/248 X |
| 4,884,423 | 12/1989 | Fancher | 70/248 |
| 4,905,802 | 3/1990 | Gotoh | 70/247 X |
| 4,932,493 | 6/1990 | Sakurai et al. | 70/248 X |
| 4,955,454 | 9/1990 | Reinert et al. | 70/252 X |
| 4,959,982 | 10/1990 | Mauz et al. | 70/248 |
| 4,982,584 | 1/1991 | Takeda et al. | 70/252 |
| 4,987,968 | 1/1991 | Martus et al. | 70/245 X |
| 5,020,344 | 6/1991 | Garcia | 70/245 |
| 5,058,462 | 10/1991 | Killiany et al. | 70/245 x |
| 5,078,242 | 1/1992 | Ratke et al. | 70/248 X |

FOREIGN PATENT DOCUMENTS 106754  4/1989  Japan ................. 70/248

Primary Examiner—Renee S. Luebke
Assistant Examiner—Suzanne L. Dino
Attorney, Agent, or Firm—Lowe, Price, LeBlanc & Becker

[57] ABSTRACT

A steering lock system includes a shift lever device in which a shift lever is operatively installed and a steering lock device in which a key cylinder is operatively disposed. In the system there is arranged a combination with a plug which is detachably fitted into an opening formed in a housing of the steering lock device; a slider movably disposed in the plug in a manner to be projectable into the housing through the opening, the slider being movable between a blocking position wherein the slider blocks rotation of the key cylinder of the steering lock device and a release position wherein the slider fails to block the rotation of the key cylinder; a resiliently flexible clip detachably fixed to the housing for achieving a tight connection between the plug and the housing; a bellcrank arranged to control movement of the shift lever of the shift lever device; and a cable member extending between the slider and the control member.

15 Claims, 8 Drawing Sheets

CABLE CONNECTOR FOR STEERING LOCK DEVICE

BACKGROUND OF THE INVENTION

1. Field of the Invention

The present invention relates in general to cable connectors, and more particularly, to cable connectors of a type which are detachably connected to a steering lock device for making a mechanical connection between a part of a shift lever device and that of the steering lock device.

2. Description of the Prior Art

Hitherto, in motor vehicles of an automatic transmission type, various safety devices have been proposed and put into practical use for suppressing a dangerous inadvertent rapid motion of the vehicle, which tends to occur when, after starting of the engine, a shift lever is moved from "PARK" position to other operative positions.

Some of them are shown in Japanese Utility Model First Provisional Publications Nos. 64-47432, 1-154928, 1-150877 and 1-114325.

The safety devices shown in Japanese Utility Model First Provisional Publications Nos. 64-47432 and 1-154928 are of a mechanical type using a cable. That is, in the safety devices of these publications, there is employed a so-called "AT shift lock system" wherein depressing a brake pedal induces disengagement of a lock plate from a detent pin for permitting movement of the shift lever from "PARK" position to other operative positions.

In the safety device of Publication No. 1-150877, there is employed a so-called "key interlock system" wherein when a key cylinder of a steering lock device assumes "ACC" (accessory) position, the shift lever can move from "PARK" position to other operative position and, when the shift lever is not at "PARK" position, the key cylinder can not be turned from "ACC" position to "LOCK" position.

Furthermore, in the safety device of Publication No. 1-114325, there is employed a so-called "shift lever lock system" wherein the movement of the shift lever from "PARK" position to other operative positions is permitted only when, with the key cylinder assuming either "ACC" position or "ON" position, the brake pedal is depressed.

The lock systems of the above-mentioned conventional safety devices generally include a control member which is positioned near the shift lever to control the movement of the same and a cable member which extends from the key cylinder of the steering lock device to the control member of the shift lever. That is, a movement of the control member caused by the movement of the shift lever has a certain effect on operative turning of the key cylinder.

However, hitherto, the manner of connecting the cable member to the key cylinder has been given little thought. In fact, the cable members disclosed in these publications include an outer cable and an inner cable which is slidably received in the outer cable. One end of the outer cable is connected through a connecting screw to a housing of the steering lock device and the other end of the outer cable is connected to a support of the shift lever. One end of the inner cable is connected to a slider in the steering lock device and the other end of the inner cable is connected to the control member of the shift lever.

The slider is slidable between a blocking position wherein the slider blocks rotation of the key cylinder and a release position wherein the slider is kept away from the key cylinder. The connection between the slider and the inner cable is made by a connecting pin which passes through respective openings formed in the slider and the inner cable. A retainer clip is fixed to the connecting pin to prevent falling of the pin from the connected parts.

However, due to their inherent constructions, the above-mentioned conventional lock systems have the following drawbacks.

First, because the retainer clip has a specially designed configuration, fixing the clip to the connecting pin needs a skilled technique and considerable time. In fact, such fixing is carried out by using a special tool.

Second, the connection of the outer cable to the housing of the steering lock device by using the connecting screw is very troublesome. In fact, such connection requires stretching of an operator's hand or hands awkwardly under, up, and around the steering lock device. During this, a screw driver held by the operator tends to abut against a dashboard of the vehicle, which seriously obstructs the connecting procedure.

Third, disconnection of the cable member from the housing of the steering lock device is troublesome and time consuming because of use of the connecting screw. This becomes much severe when, due to loss of a key, change of the steering lock device is necessary.

SUMMARY OF THE INVENTION

It is therefore an object of the present invention to provide a cable connector for a steering lock device which is free of the above-mentioned drawbacks.

According to the present invention, there is provided a combination in a system including a shift lever device in which a shift lever is operatively installed and a steering lock device in which a key cylinder is operatively disposed. The combination comprises mouth means defining an opening in a housing of the steering lock device; a plug detachably fitted into the opening; a slider movably disposed in the plug in a manner to be projectable into the housing through the opening, the slider being movable between a blocking position wherein the slider blocks rotation of the key cylinder of the steering lock device and a release position wherein the slider fails to block the rotation of the key cylinder; a resiliently flexible clip detachably fixed to the mouth means for achieving a tight connection between the plug and the mouth means; a control member arranged to control movement of the shift lever of the shift lever device; and a cable member extending between the slider and the control member.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Referring to FIGS. 1 to 9, there is shown a first embodiment of the present invention.

Figure 3:
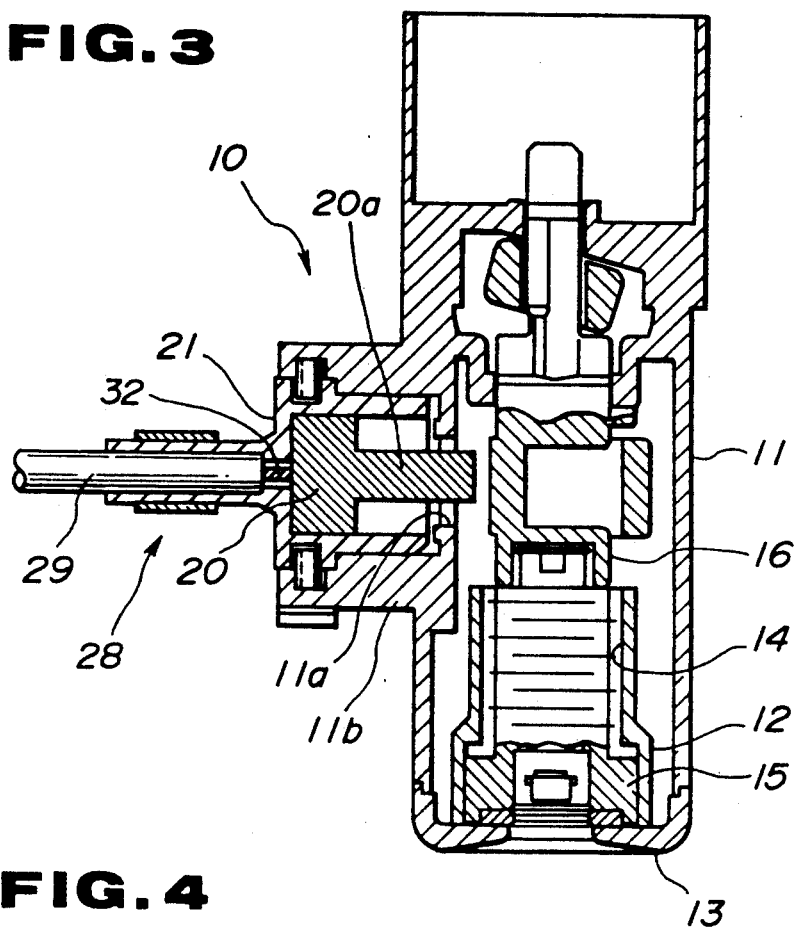
FIG. 3 is a longitudinally sectional view of the steering lock device in a condition wherein a key cylinder assumes "LOCK" position.

As is understood from FIG. 3, a steering lock device 10 to which the first embodiment is practically applied comprises a generally cylindrical housing 11, a sleeve 12 stationarily received in the housing 11 and a cap 13 fixed to the housing in a manner to cover a front portion of the sleeve 12. Rotatably disposed in a cylindrical bore 14 of the sleeve 12 is a key cylinder 15. The key cylinder 15 is equipped with a plurality of known tumblers (no numerals). The detail of the steering lock device of this type is shown in Japanese Patent Second Provisional Publication No. 60-42055.

Figure 1:
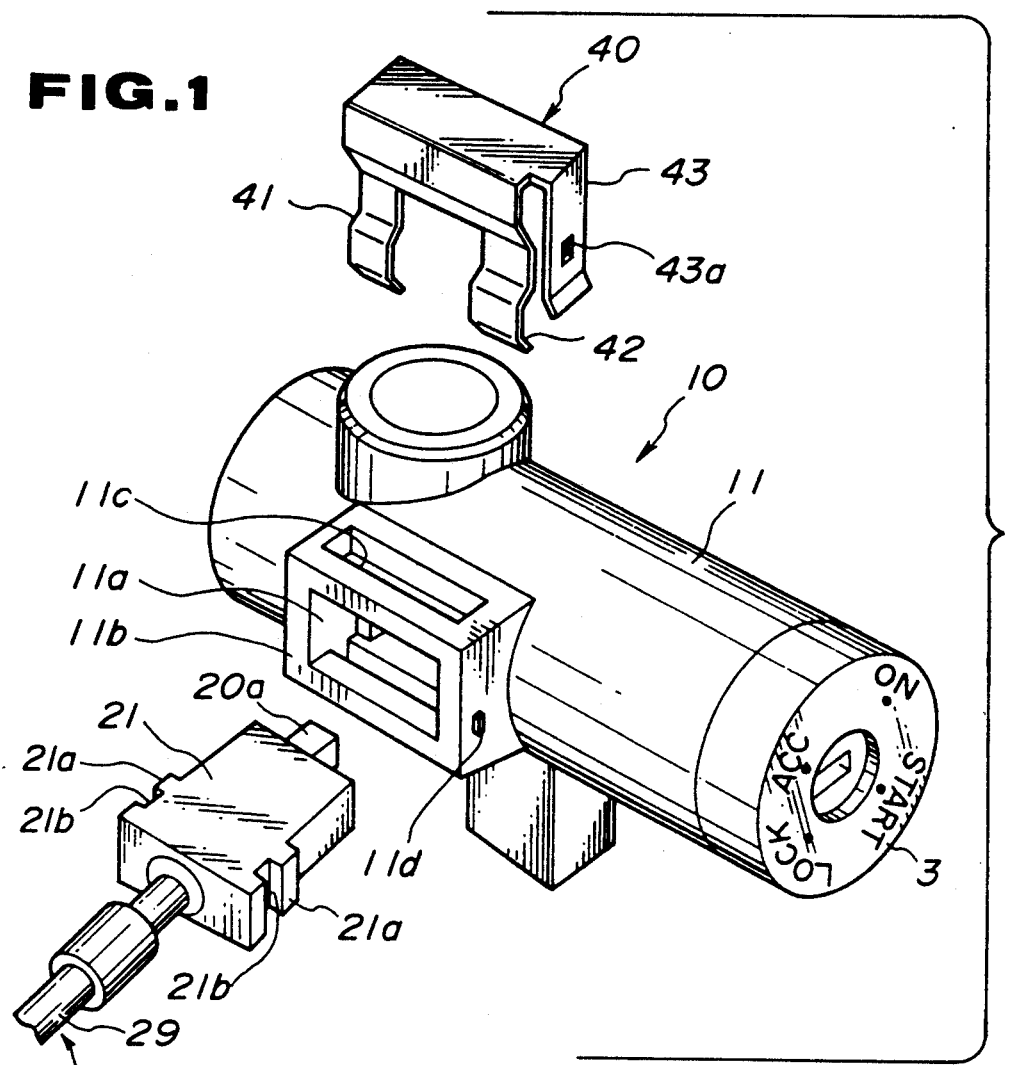
FIG. 1 is a perspective view of a steering lock device equipped with a cable connector, which is a first embodiment of the present invention.

As is best shown in FIG. 1, the housing 11 is formed at its cylindrical side surface with a rectangular projection 11b. The projection 11b is formed with a rectangular bore 11a through which the interior of the housing 11 is communicated with outside of the housing 11 (see FIG. 3). The rectangular projection 11b is formed at its upper and lower walls with aligned rectangular slots 11c and 11c' and at its front wall with a small projection 11d. The four wall surfaces of each slot 11c or 11c' extend normal to the axis of the rectangular bore 11a.

As is seen from FIG. 3, behind the key cylinder 15, there is arranged a rotating member 16 which rotates in the housing 11 together with the key cylinder 15.

Figure 4:
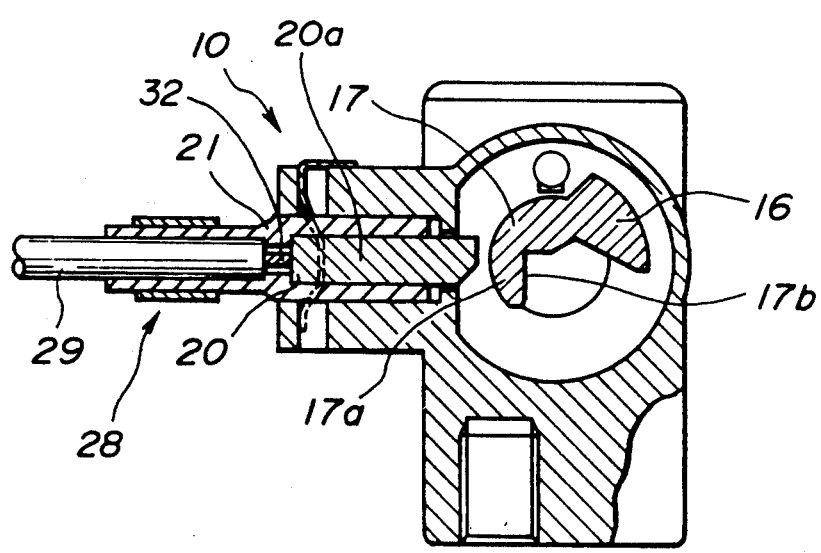
FIG. 4 is a laterally sectional view of the steering lock device in a condition wherein the key cylinder assumes "LOCK" position.

As is seen from FIG. 4, the rotating member 16 is formed about its outer surface with a stopper portion 17 which comprises a first stopper surface 17a and a second stopper surface 17b. The first stopper surface 17a is convex and the second stopper surface 17b is flat and positioned behind the first stopper surface 17a.

It is to be noted that FIGS. 3 and 4 show a condition wherein the key cylinder 15 takes "LOCK" position.

As is seen from FIG. 1, a cable member 28 is employed, which, as will become apparent as the description proceeds, functions to transmit movement of a control member or bellcrank (31, see FIG. 12) of a shift lever device 100 to an after-mentioned slider (20).

The cable member 28 comprises an outer cable 29 (see FIG. 3) and an inner cable 32 which is slidably received in the outer cable 29.

As is seen from FIG. 1, the cable member 28 has at its end a generally rectangular plug 21, the plug 21 being detachably fitted into the rectangular bore 11a of the housing 11. The plug 21 is constructed of rigid plastic, such as Nylon (trade name), polyacetal or the like.

A plastic slider 20 is axially slidably received in the plug 21. The slider 20 has an elongate portion 20a whose leading end is projected outward from the plug 21.

The connection of the plug 21 to the cable member 28 is so made that the outer cable 29 is fixed to the plug 21 and the inner cable 32 is fixed to the slider 20. Thus, a sliding movement of the inner cable 32 in the outer cable 29 brings about a sliding movement of the slider 20 in the plug 21.

As is seen from FIG. 1, the plug 21 is formed at its both sides with raised portions 21a, each being formed with a vertically extending groove 21b.

Figure 2:
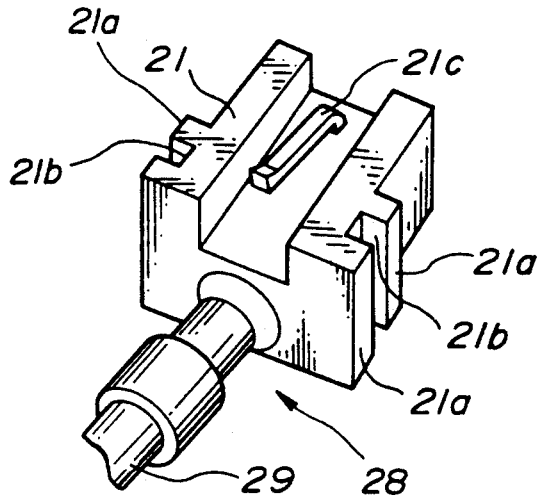
FIG. 2 is a bottom view of a slider employed in the first embodiment.

As is seen from FIG. 2, the plug 21 is formed at its bottom portion with an axially extending groove (no numeral), and at a bottom surface of the groove with a latching pawl 21c which is resiliently flexible.

Figure 12:
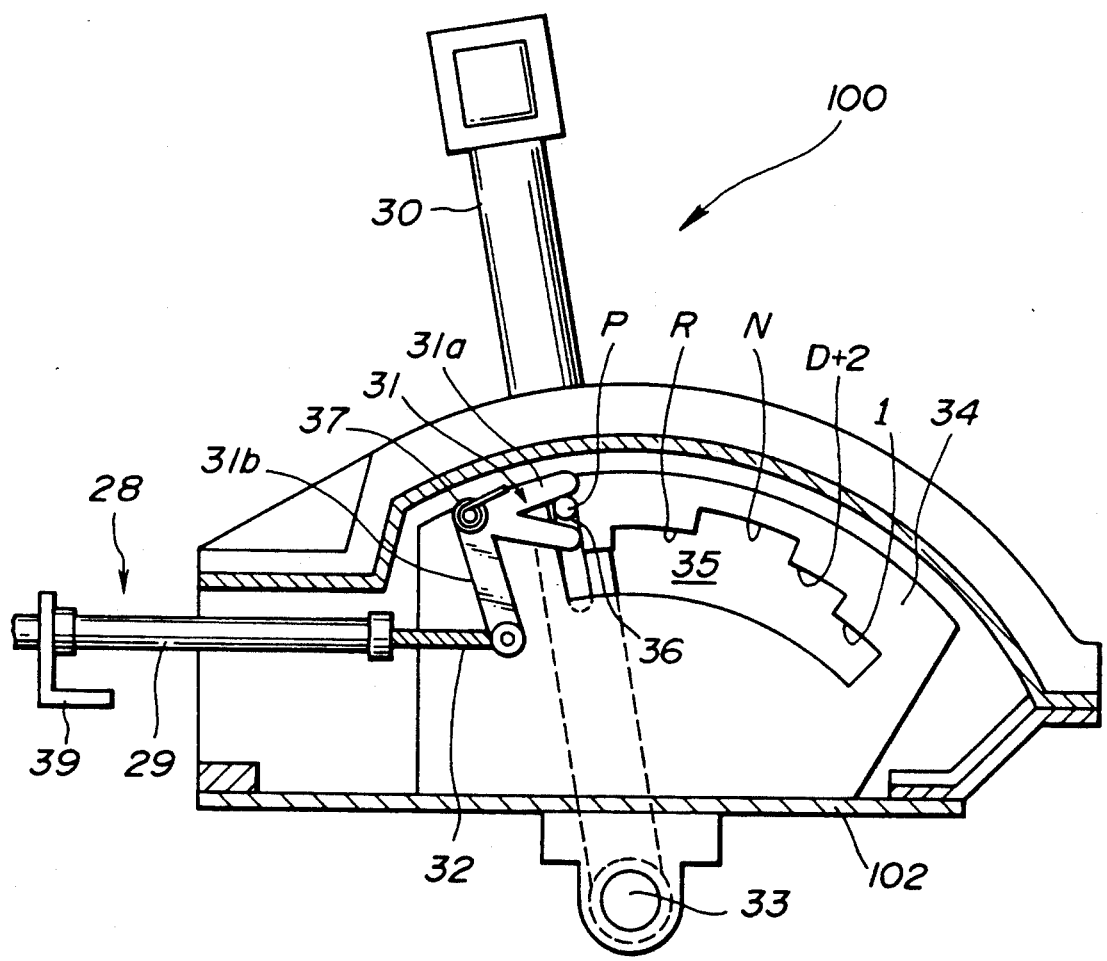
FIG. 12 is a sectional view of a shift lever device in a condition wherein a shift lever assumes "PARK" position.

As will be understood from FIG. 12, the other end of the outer cable 29 of the cable member 28 is fixed to a support bracket 39 positioned near the shift lever device 100. The other end of the inner cable 32 is pivotally connected to the bellcrank 31 which is installed in the shift lever device 100. The bellcrank 31 serves as the control member for controlling the movement of the shift lever 30, as will become apparent hereinafter.

Referring back to FIG. 3, when the plug 21 is properly fitted into the rectangular bore 11a of the housing 11, the projected end of the elongate portion 20a of the slider 20 faces the stopper portion 17 of the rotating member 16 in the housing 11. As will be described in detail hereinafter, when the slider 20 assumes a projected or blocking position, the rotation of the rotating member 16 is restricted.

As is seen from FIG. 1, in order to detachably retain the plug 21 in the rectangular opening 11a of the housing 11, a metal clip 40 is used, which comprises a flat base portion (no numeral), a pair of arm portions 41 and 42 extending downward from one side of the base portion and a lug portion 43 extending downward from one longitudinal end of the base portion. Each arm portion 41 or 42 has a convexly bent portion. The lug portion 43 is formed with a rectangular small opening 43a.

In the following, steps for fitting the plug 21 into the rectangular opening 11a of the housing 11 will be described.

Figure 9:
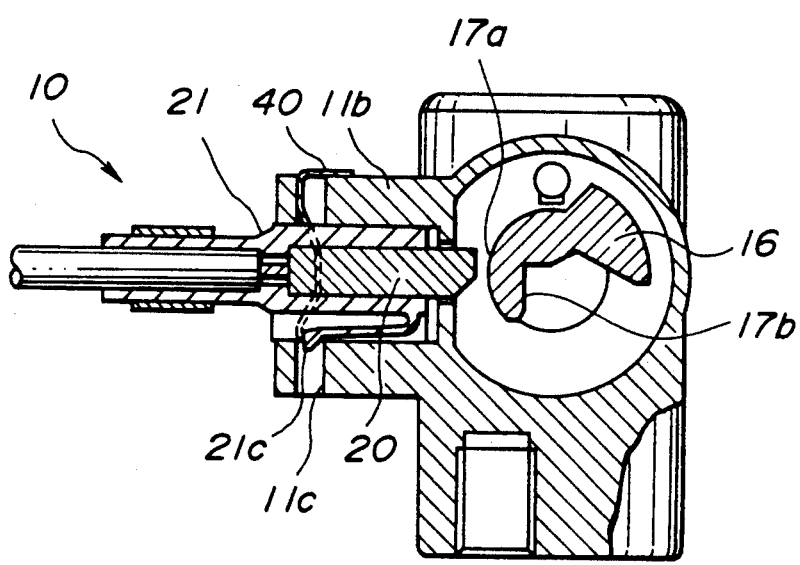
FIG. 9 is a laterally sectional view of the steering lock device in a condition wherein a clip is properly fitted to a given portion.

First, the plug 21 is inserted into the opening 11a to such a degree that the latching pawl 21c of the plug 21 is in engagement with the lower rectangular slot 11c' of the opening 11a, as will be understood from FIG. 9.

It is to be noted that the engagement of the latching pawl 21c to the slot 11c' permits an operator to feel that the plug 21 reaches a proper position relative to the opening 11a of the housing 11. Under this condition, both the grooves 21b of the plug 21 are mated at their upper and lower ends with the upper and lower rectangular slots 11c and 11c'.

Then, the clip 40 is disposed onto the rectangular projection 11b of the housing 11, and the two arm portions 41 and 42 are inserted into the upper rectangular slot 11c, engaged with the grooves 21b of the plug 21 and finally inserted into the lower rectangular slot 11c'. The final condition of the clip 40 will be understood from FIG. 4. During insertion of the arm portions 41 and 42 into the upper and lower rectangular slots 11c and 11c', the lug portion 43 of the clip 40 slides downward along the front wall of the rectangular projection 11b of the housing 11 and finally, the rectangular small opening 43a of the lug portion 43 catches the small projection 11d of the front wall.

Upon this, the plug 21 is stably held in the rectangular opening 11a of the housing 11. That is, because the lug portion 43 is resiliently pressed against the front wall of the projection 11b and the convexly bent parts of the two arm portions 41 and 42 are resiliently engaged with the grooves 21b of the plug 21, the plug 21 can be held in the opening 11a without play.

When the clip 40 is taken away from the rectangular projection 11b by taking the reversed steps, the plug 21 can be readily removed from the opening 11b by only pulling the same with a slight force. The slight force is a force which overcomes the biasing force produced by the latching pawl 21c.

Referring to FIG. 12, there is shown the shift lever device 100 which is incorporated with the above-mentioned steering lock device 10. As will become apparent from the following description, the shift lever device 100 has a conventional construction except for the control member 31 (viz., bellcrank).

The shift lever device 100 comprises a shift lever 30 which has a lower end pivotally connected through a pivot shaft 33 to a fixed base member 102. Raised from the base member 102 is a positioning plate 34 which has an arcuate opening 35 whose upper periphery is formed with a plurality of steps "P", "R", "N", "D+2" and "1". These steps are arranged to correspond to positions which the shift lever 30 takes when "Parking condition", "Reverse condition", "Neutral condition", "Drive condition", "Second speed condition" and "First speed condition" of an associated automatic transmission are required.

Slidably engaged with these steps is a shift pin 36 which is carried by the shift lever 30. Although not shown in the drawing, the shift pin 36 is connected through a rod to a shift lever knob which is mounted on the head of the shift lever 30. Biasing means is installed in the shift lever 30 to bias the rod upward, that is, toward the head of the shift lever. Thus, usually, that is, when the shift lever knob is not applied with an external force by a driver, the shift pin 36 is pressed against the upper periphery of stepped arcuate opening 35 of the positioning plate 34. Under this condition, the pivoting movement of the shift lever 30 is restricted by a certain degree due to obstruction of each gap defined between adjacent steps to the shift pin 36. That is, when the shift pin 36 is put in the recess "P" of the arcuate opening 35, the shift lever 30 can not be pivoted to other positions. However, when the shift lever knob is pressed down against the force of the biasing means, the shift pin 36 is moved apart from the stepped upper periphery of the arcuate opening 35 of the positioning plate 34. Thus, with the shift lever knob kept pressed, the shift lever 30 can be freely moved from Parking position to 1'st speed position and vice versa.

The bellcrank 31 is pivotally connected through a pivot pin 37 to the positioning plate 34 near the recess "P". The bellcrank 31 comprises a forked portion 31a which is engageable with the shift pin 36 in the recess "P" and an arm portion 31b whose leading end has the inner cable 32 pivotally connected thereto.

It is to be noted that when the shift pin 36 is in the recess "P" as shown in FIG. 12, the bellcrank 31 assumes the illustrated uppermost angled position permitting the forked position 31a thereof to catch the shift pin 36 and drawing out the inner cable 32 from the outer cable 29 greatly. Under this condition, the slider 20 (see FIGS. 3 and 4) in the plug 21 assumes its outermost or release position as shown in FIGS. 3 and 4.

In the following, the operation of the device is described in detail with reference to the accompanying drawings.

For ease of understanding, the description of operation will be commenced with respect to a condition wherein, as shown in FIG. 12, the shift lever 30 assumes "Park" position having the shift pin 36 put in the recess "P" of the positioning plate 34, and as shown in FIGS. 3 and 4, the key cylinder 15 assumes "LOCK" position. Under this condition, the bellcrank 31 assumes the uppermost angled position drawing out the inner cable 32 from the outer cable 20 greatly and thus the slider 20 in the plug 21 assumes its outermost or release position, as is described hereinabove.

Under this condition, the shift lever knob on the shift lever 30 can not be pushed down. That is, when, with the intention of moving the shift lever 30 to other positions, the shift lever knob is applied with a pressing force by a driver, the shift pin 36 urges the bellcrank 31 to pivot in a clockwise direction in FIG. 12 that is, in a direction to draw the inner cable 32 into the outer cable 29. However, since, as will be understood from FIG. 4, the draw-in movement of the inner cable 32 brings about an instant abutment of the slider 20 against the first stopper surface 17a of the rotating member 16, the clockwise pivoting of the bellcrank 31 is not accomplished. This means that under such condition, effective pushing of the shift lever knob can not be carried out and thus the shift lever 30 can not be moved to other positions. In other words, the shift lever 30 is locked at PARK position.

Under this condition, however, the key cylinder 15 can be turned to START position with a key to start an associated engine, as will be seen from FIGS. 3 and 4.

Figure 5:
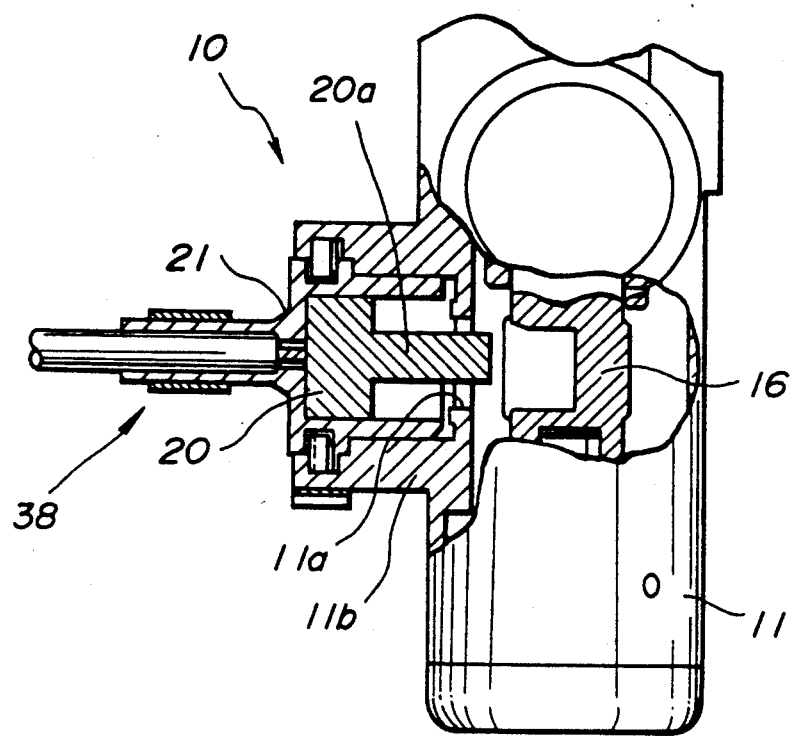
FIG. 5 is a view similar to FIG. 3, but showing a condition wherein the key cylinder assumes "ACC" position with the slider assuming a release position.
Figure 6:
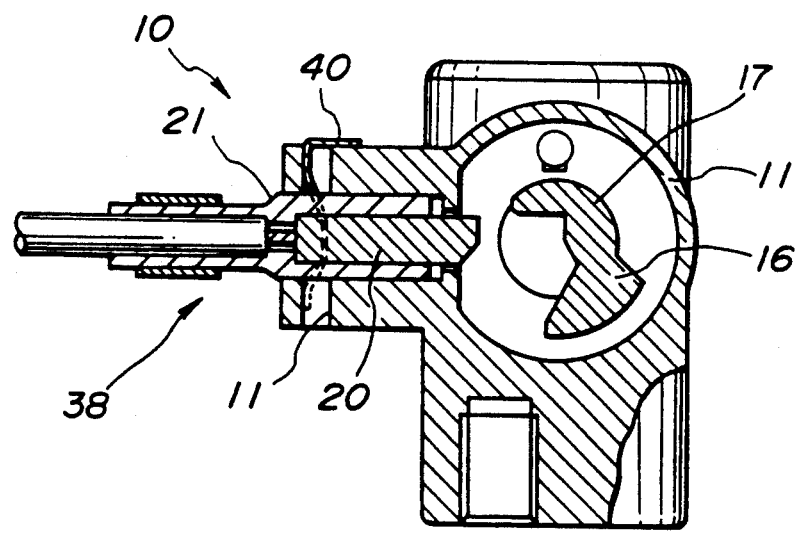
FIG. 6 is a view similar to FIG. 4, but showing a condition wherein the key cylinder assumes "ACC" position with the slider assuming the release position.

When the key cylinder 15 is then turned to ACC (accessary) position which is positioned between LOCK (OFF) and ON positions, the rotating member 16 assumes the position as shown in FIGS. 5 and 6. In this position, the stopper portion 17 of the rotating member 16 is kept apart from the slider 20 in the plug 21 to permit an inward movement of the slider 20.

Figure 7:
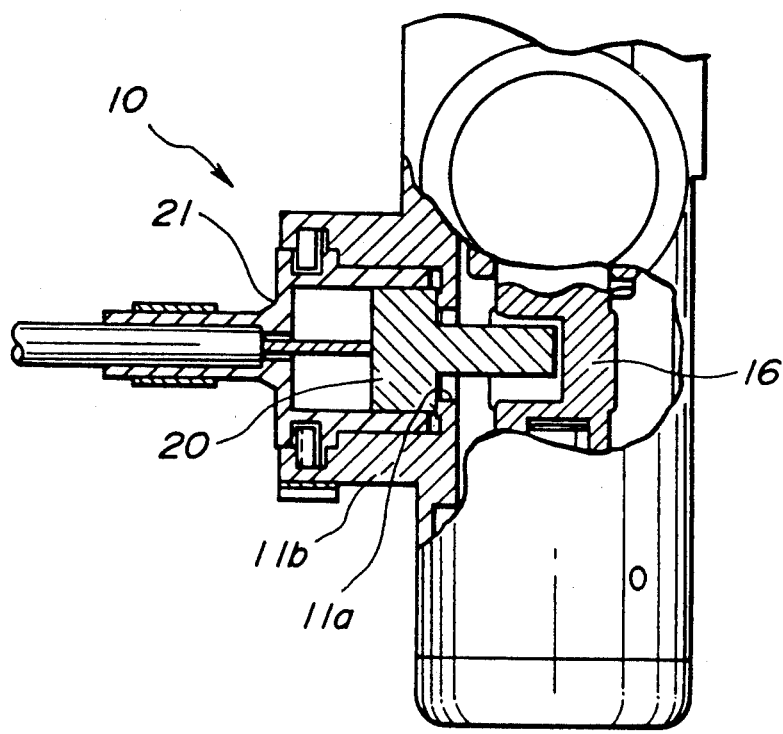
FIG. 7 is a view similar to FIG. 3, but showing a condition wherein the key cylinder assumes "ACC" position with the slider assuming a blocking position.
Figure 8:
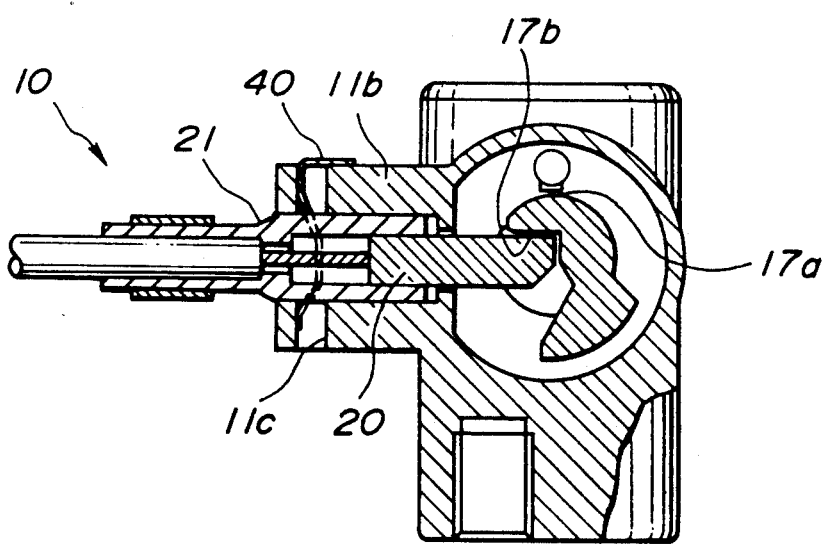
FIG. 8 is a view similar to FIG. 4, but showing a condition wherein the key cylinder assumes "ACC" position with the slider assuming the blocking position.
Figure 13:
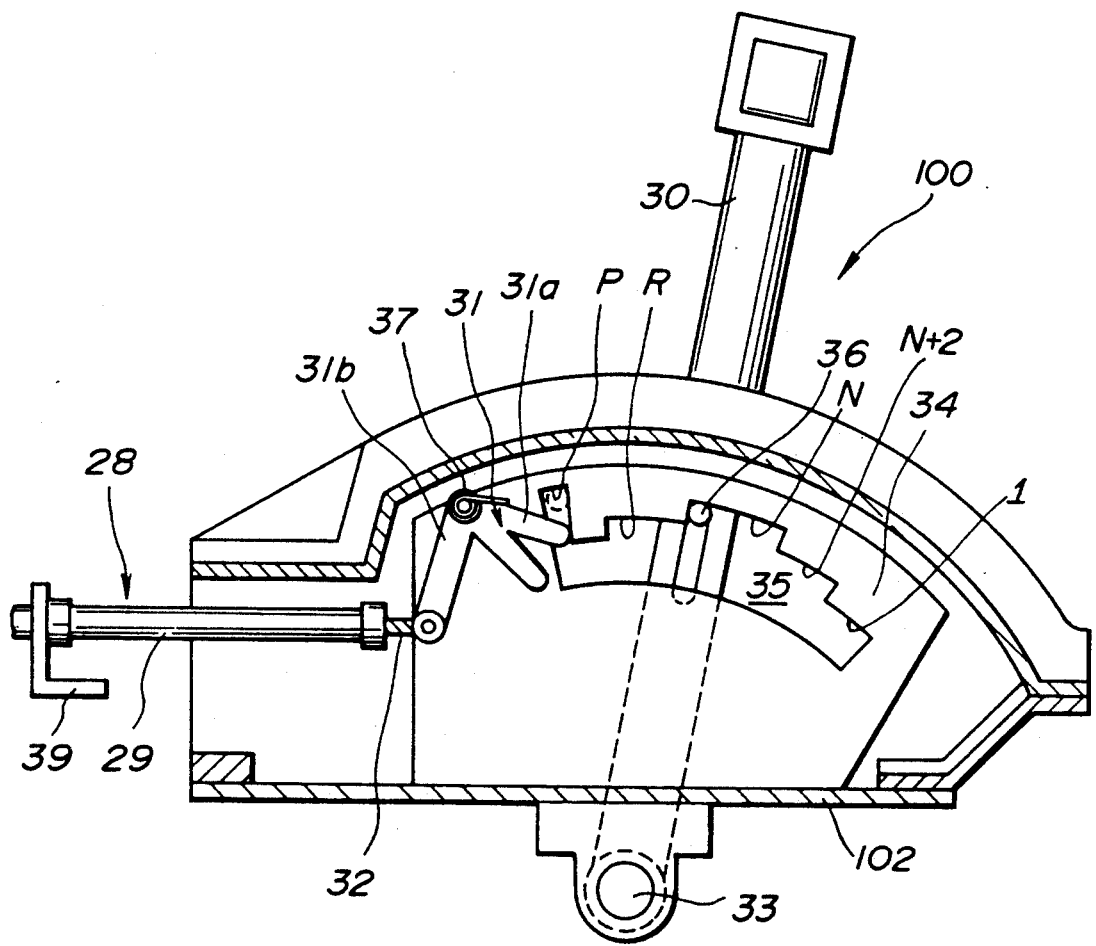
FIG. 13 is a view similar to FIG. 12, but showing a condition wherein the shift lever assumes "D" (drive) position.

Thus, when the key cylinder 15 assumes the ACC position, the shift lever knob can be operatively pushed down and thus, as is seen from FIG. 12, the shift lever 30 can move from Park position to other positions, such as Neutral position as shown in FIG. 13. Due to pressing of the shift lever knob, the shift pin 36 is moved downward making a sufficient clockwise pivoting of the bellcrank 31 and thus sufficiently drawing the inner cable 32 into the outer cable 29. Thus, the slider 20 in the plug 21 assumes its innermost or blocking position as shown in FIGS. 7 and 8. In this position, the slider 20 is in abutment with the second stopper surface 17b of the rotating member 16, so that the key cylinder 15 can not be turned from "ACC" position to "LOCK" position.

This means that when the shift lever 30 assumes a position other than "PARK" turning of the key cylinder 15 from "ACC" position to "LOCK" position is not permitted.

When, under this condition, turning of the key cylinder 15 to "LOCK" position is intended, returning of the shift lever 30 to "PARK" position is necessary. That is, during this returning, the shift pin 36 contacts and pivots the forked portion 31a of the bellcrank 31 in a counterclockwise direction in FIG. 13 thereby drawing out the inner cable 32 from the outer cable 29. With this, the slider 20 in the plug 21 is shifted from the blocking position to the release position, so that the key cylinder 15 can be turned to "LOCK" position. At this "LOCK" position, the key can be removed from the key cylinder 15.

Figure 10:
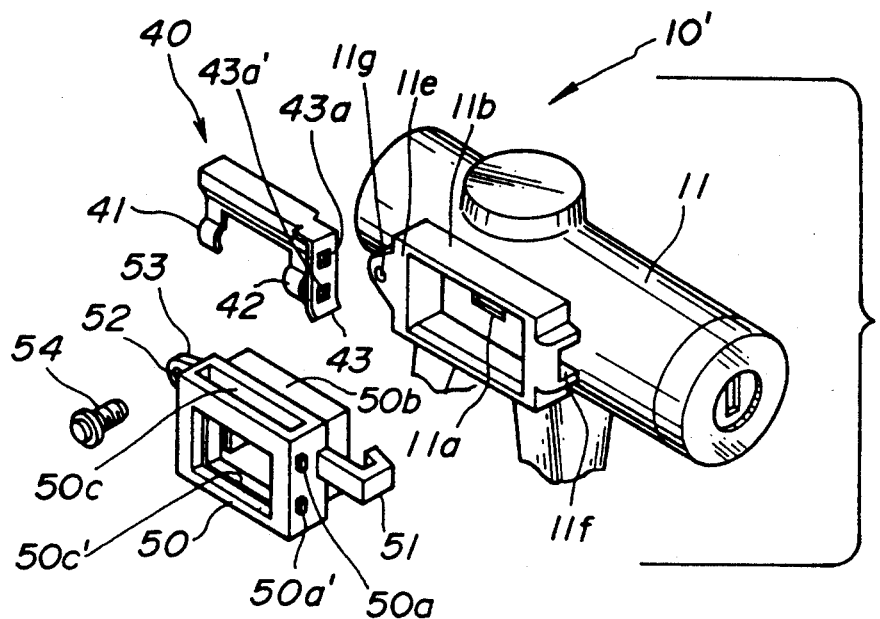
FIG. 10 is an perspective view of a steering lock device which is equipped with a cable connector of a second embodiment of the present invention.
Figure 11:
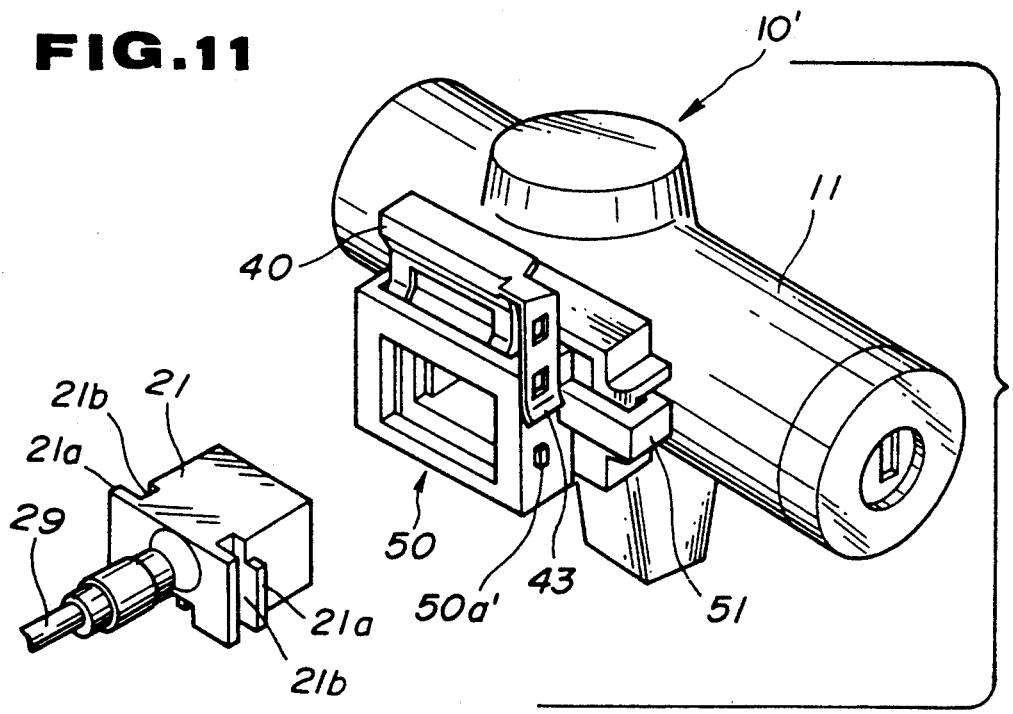
FIG. 11 is an enlarged perspective view of the steering lock device of FIG. 10 with some parts assembled.

Referring to FIGS. 10 and 11, there is shown a second embodiment of the present invention.

As clearly shown in FIG. 10, the cylindrical housing 11 of the steering lock device 10' is formed at its cylindrical side surface with a rectangular projection 11b. The projection 11b is formed with a rectangular recess whose bottom surface is formed with a small rectangular bore 11a through which the interior of the housing 11 is communicated with outside of the housing 11. The rectangular projection 11b has at a rear side a flange 11e and at a front side a recess 11f. The flange 11e is formed with a threaded bore 11g.

Designated by numeral 50 is a rectangular frame member which is to be fixed to the rectangular projection 11b. The frame member 50 has a smaller sized rectangular part 50b which is to be neatly received in the rectangular recess of the projection 11b of the cylindrical housing 11. The rectangular frame member 50 is formed at its upper and lower walls with aligned rectangular slots 50c and 50c' and has at its rear wall a flange 53 and at its front wall a hook 51 and two small projections 50a and 50a'. The flange 53 has an bolt opening 52 formed therethrough.

In order to fix the frame member 50 to the rectangular projection 11b of the housing 11, the hook 51 of the frame member 50 is engaged with the recess 11f of the projection 11b and a bolt 54 is passed through the bolt opening 52 of the frame member 50 and screwed into the threaded bore 11g of the rectangular projection 11b. With this, the frame member 50 is tightly fixed to the projection 11b of the housing 11 having the smaller sized rectangular part 50b neatly received in the projection 11b, as will be understood from FIG. 11.

Referring back to FIG. 10, designated by numeral 40 is a metal clip which comprises a flat base portion (no numeral), a pair of arm portions 41 and 42 and a lug portion 43. The lug portion 43 is formed with rectangular small openings 43a and 43a'.

In order to fit the plug 21 into the rectangular opening of the assembled frame member 50, the clip 40 is put on the frame member 50 to assume a temporarily set position wherein, as shown in FIG. 11, the lower small opening 43a' of the lug portion 43 is engaged with the upper small projection 50a of the frame member 50, and then the plug 21 is inserted into the opening of the frame member 50. When the plug 21 takes a proper position in the frame member 50, the clip 40 is pushed down for achieving the frictional engagement between each arm portion 41 or 42 with a corresponding groove 21b of the plug 21. Due to this downward movement of the clip 40, the two small openings 43a and 43a' of the lug portion 43 of the clip 40 are properly engaged with the two small projections 50a and 50a' of the frame member 50.

In this disclosure, there are shown and described only the preferred embodiments of the invention, but, as aforementioned, it is to be understood that the invention is capable of use in various other combinations and environments and is capable of changes or modifications within the scope of the inventive concept as expressed herein.

What is claimed is:

1. A steering lock system including a shift lever device in which a shift lever is operatively installed and a steering lock device in which a key cylinder is operatively disposed, comprising:

mouth means defining an opening in a housing of said steering lock device;

a plug detachably fitted into said opening;

a slider movably disposed in said plug in a manner to be projectable into said housing through said opening, said slider being movable between a blocking position wherein said slider blocks rotation of said key cylinder of the steering lock device and a release position wherein said slider fails to block the rotation of said key cylinder;

a resiliently flexible clip detachably fixed to said mouth means for achieving a tight connection between said plug and said mouth means;

a control member arranged to control movement of said shift lever of the shift lever device; and a cable member connected at a first end to the slider, extending between said slider and said control member and connected at a second end to the control member to be moved in correspondence therewith.

2. The system according to claim 1, wherein:

said cable member comprises an outer cable having one end fixed to said plug and the other end fixed to a fixed potion of said shift lever device and an inner cable slidably disposed in said outer cable, said inner cable having one end fixed to said slider and the other end fixed to said control member.

3. The system according to claim 2, wherein:

said mouth means comprises a rectangular structure provided on a side surface of said housing in a manner to project laterally therefrom; and means defining in upper and lower walls of said rectangular structure, rectangular aligned slots into which a part of said clip is inserted when the tight connection between said plug and said mouth means is carried out.

4. The system according to claim 1, wherein:

said control member is a bellcrank which is pivotally connected to a fixed portion of said shift lever device, said bellcrank being forced to pivot and thus move said cable member when said shift lever is moved from one given position to other positions and vice versa.

5. The system according to claim 4, wherein:

said bellcrank has a forked portion which is engageable with a shift pin carried by said shift lever.

6. A steering lock system including a shift lever device in which a shift lever is operatively installed and a steering lock device in which a key cylinder is operatively disposed, comprising:

mouth means defining an opening in a housing of said steering lock device;

a plug detachably fitted into said opening;

a slider movably disposed in said plug in a manner to be projectable into said housing through said opening, said slider being movable between a blocking position wherein said slider blocks rotation of said key cylinder of the steering lock device and a release position wherein said slider fails to block the rotation of said key cylinder;

a resiliently flexible clip detachably fixed to said mouth means for achieving a tight connection between said plug and said mouth means;

a control member arranged to control movement of said shift lever of the shift lever device; and a cable member, extending between said slider and said control member, which includes an outer cable having one end fixed to said plug and the other end fixed to a fixed portion of said shift lever device and an inner cable slidably disposed in said outer cable, said inner cable having one end fixed to said slider and the other end fixed to said control member, wherein said mouth means comprises a rectangular structure provided on a side surface of said housing in a manner to project laterally therefrom and means defining in upper and lower walls of said rectangular structure, rectangular aligned slots into which a part of said clip is inserted when the tight connection between said plug and said mouth means is carried out, and wherein a part of said clip forms a pair of arm portions which, when fully inserted into said rectangular aligned slots, resiliently engage with respective grooves formed at both sides of said plug.

7. The system according to claim 6, wherein:
each of said arm portions has a convexly bent portion to achieve a frictional engagement with the corresponding groove of the plug.

8. The system according to claim 7, wherein:
said clip has a lug portion which is resiliently pressed against a selected portion of said rectangular structure when said clip is properly fixed to said rectangular structure.

9. The system according to claim 8, wherein:
said lug portion is formed with at least one opening which, when said clip is properly fixed to said rectangular structure, latchingly engages with a projection formed on said selected portion of said rectangular structure.

10. The system according to claim 9, wherein:
said plug is formed to have a back surface with a latching pawl which, when said plug is properly inserted into the opening of said mouth means, latchingly engages with the rectangular slot of the lower wall of said rectangular structure.

11. The system according to claim 10, wherein:
said rectangular structure is integral with said housing of said steering lock device.

12. The system according to claim 10, wherein:
said rectangular structure is a separate member which is detachably mounted to said housing.

13. The system according to claim 12, wherein:
said mouth means further comprises a rectangular projection integrally formed on the side surface of said housing, said rectangular projection being formed with a rectangular recess having a bottom surface formed with a small rectangular bore through which a part of said slider is projectable into said housing, and connecting means for detachably connecting said rectangular structure to said rectangular projection.

14. The system according to claim 13, wherein:
said connecting means comprises
a hook formed on one end of said rectangular structure;
a first flange formed on the other end of said rectangular structure;
means defining a recess at one end of said rectangular projection, said recess being latchingly engageable with said hook; and
a second flange formed on the other end of said rectangular projection; and
a bolt connecting said first and second flanges.

15. A steering lock system including a shift lever device in which an shift lever is operatively installed and a steering lock device in which a key cylinder is operatively disposed, comprising:
mouth means defining an opening in a housing of said steering lock device;
a plug detachably fitted into said opening;
a slider movably disposed in said plug in a manner to be projectable into said housing through said opening, said slider being movable between a blocking position wherein said slider blocks rotation of said key cylinder of the steering lock device and a unblocking position wherein said slider fails to block the rotation of said key cylinder;
a resiliently flexible clip detachably fixed to said mouth means for achieving a tight connection of said plug with said mouth means;
a bellcrank pivotally connected to said shift lever device to control movement of said shift lever, said bellcrank being forced to pivot when said shift lever is moved from one given position to other positions and vice versa; and
a cable member, said cable member including an outer cable having one end fixed to said plug and the other end fixed to a fixed portion of said shift lever device, and an inner cable slidably disposed in said outer cable, said inner cable having a first end fixed to said slider and a second end fixed to said bellcrank, whereby movements of said bellcrank directly cause corresponding movements of said slider to said blocking and unblocking positions thereof.

* * * * *